June 5, 1951  J. J. ROSE  2,555,457
CHALK LINE REEL AND STAKE
Filed Dec. 20, 1946  2 Sheets-Sheet 1

Inventor
John J. Rose
By Clarence A. O'Brien
and Harvey B. Jacobson
Attorneys

June 5, 1951  J. J. ROSE  2,555,457
CHALK LINE REEL AND STAKE
Filed Dec. 20, 1946  2 Sheets-Sheet 2

*Inventor*
John J. Rose

By *Clarence A. O'Brien
and Harvey B. Jacobson*
*Attorneys*

Patented June 5, 1951

2,555,457

UNITED STATES PATENT OFFICE 2,555,457

CHALK LINE REEL AND STAKE

John J. Rose, McMechen, W. Va.

Application December 20, 1946, Serial No. 717,506

3 Claims. (Cl. 242—100)

This invention relates to improvements in chalk line reels and stakes.

An object of the invention is to provide an improved chalk line reel and stake which will support many yards of chalk line upon the reel, and a cooperating braced deadman or stake having means for supporting the end of the chalk line when used for laying out any desired type of distance measurements.

Another object of the invention is to provide an improved combined chalk line reel and stake which will be associated with a braceable deadman or stake, said stakes being exactly three feet in length, whereby rows or measurements may be quickly and accurately made by the judicious use of the apparatus forming the subject matter of the instant invention.

A further object of the invention is to provide an improved form of braced combined chalk line reel and stake and a cooperating braced deadman or stake which may be readily driven into the ground and connected together by said chalk line for making accurate measurements for various and sundry purposes.

Another object of the invention is to provide an improved chalk line reel and stake and an associated braceable deadman or stake which will be highly efficient when used and in operation, and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
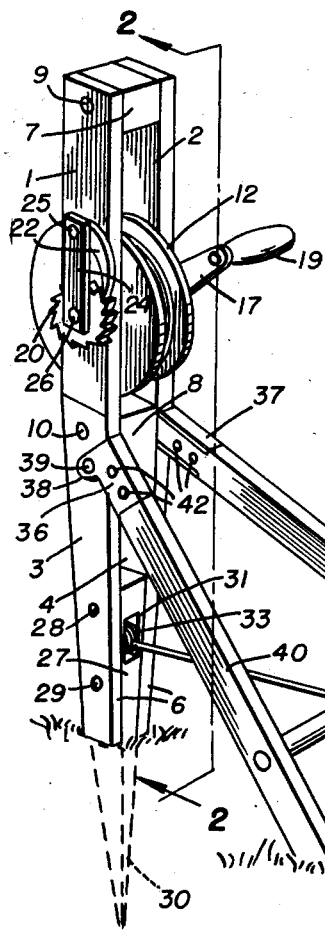
Figure 1 is a perspective view of the improved chalk line reel and stake and braceable deadman or stake connected therewith by a chalk line, shown as in actual use.
Figure 5:
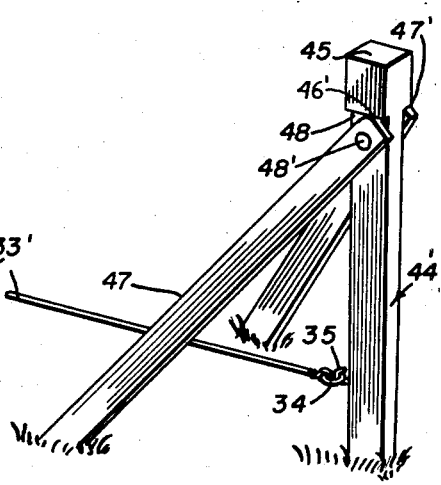
Figure 5 is a perspective veiw of a deadman stake with bracing members hinged thereto and a hollow metal point disposed on the lower end of the stake.
Figure 5:
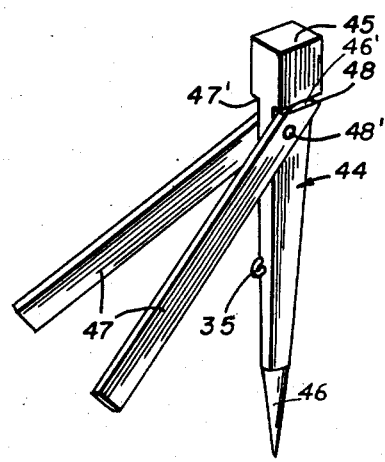

In carrying out the invention, there is provided an improved form of chalk line reel and stake and an associated deadman or stake having means for attaching one end of the chalk line thereto.

The combined chalk line reel and stake includes a pair of elongated side rails 1 and 2 which extend in parallel spaced relation throughout approximately the upper half thereof, and the lower half of said side rails 1 and 2 are angled inwardly as at 3 and 4 and are formed with tapered opposed end edges 5 and 6.

Spacing blocks 7 and 8 are disposed between the side rails 1 and 2, being held in place by the pins 9 and 10 respectively, which extend through said side rails and blocks to hold the same in fixed and rigid position.

An axle or shaft 11 extends through the side rails 1 and 2 and supports a reel 12 secured thereon by means of the key 13, while bearing or thrust washers 14 and 15 are disposed over the axle or shaft 11 at the opposite sides of the reel 12 between the same and the adjacent inner surfaces of said side rails 1 and 2.

The washer 16 and hand operated crank 17 are secured on an outer end of the axle or shaft 11, said crank being fixed in position by means of the pin 18 extending through it and through said axle or shaft. A handle 19 is rotatably mounted upon the end of the crank 17 for manually operating the reel 12.

A toothed ratchet wheel 20 is secured on the opposite end of the axle or shaft 11 by means of the pin 21, and cooperates with the pawl or dog 22 mounted upon the bolt 23 which is threaded into the adjacent side rail 1. The connecting plate 24 is disposed on the outer ends of said bolt 23 and axle or shaft 11, being retained in place by the heads 25 and 26 formed on said bolt and axle respectively.

Figures 2, 3, 4:
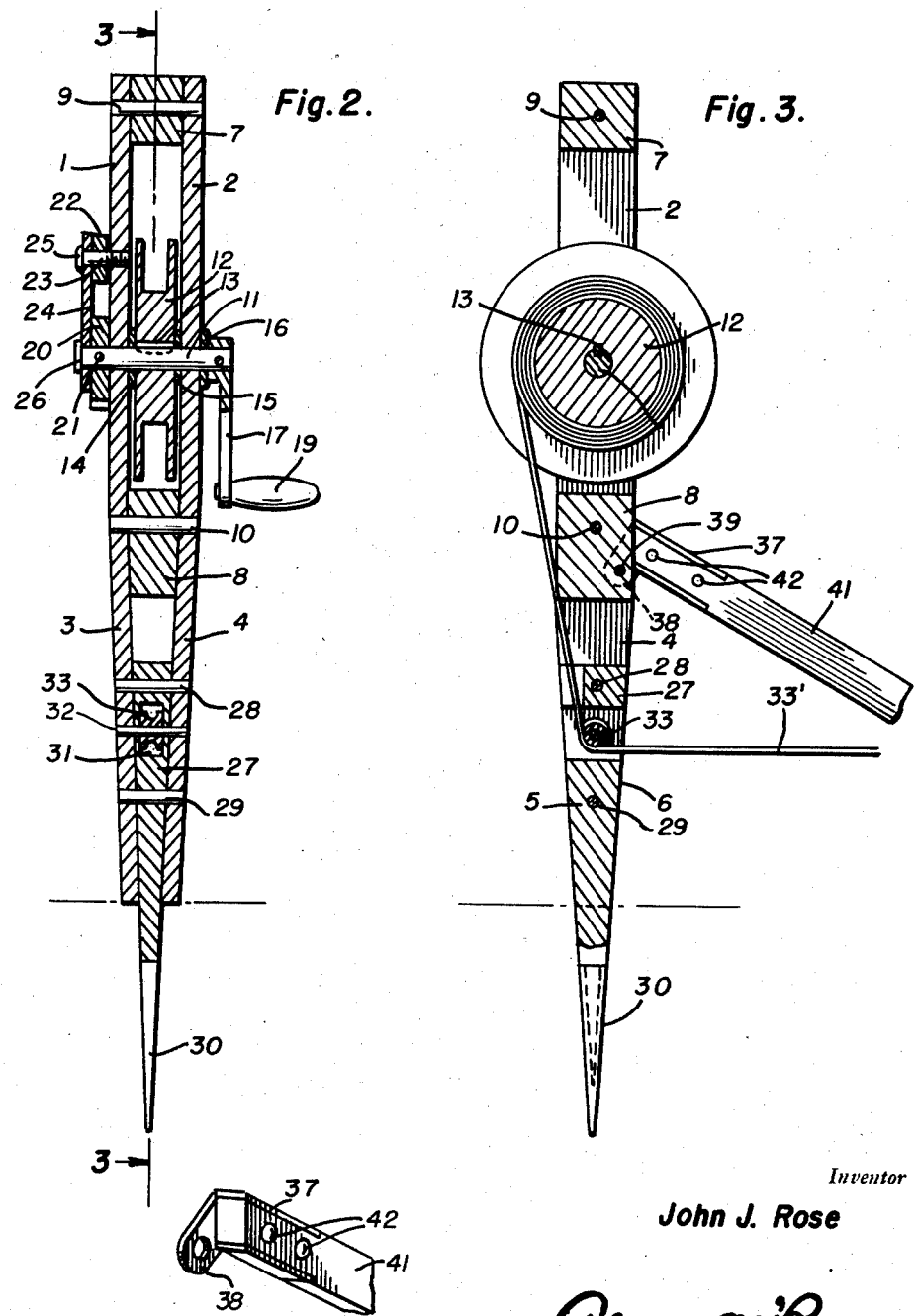
Figure 2 is a sectional view taken on the line 2—2 of Figure 1.
Figure 3 is a sectional view taken on the line 3—3 of Figure 2.
Figure 4 is a detail view of one end of a stake bracing member showing a hinge connection supported in place thereon.

A combined spacing block, pulley housing and stake point is generally designated by the reference numeral 27, being formed with tapered opposite sides which are supported between the lower terminal ends of said inwardly angled portions 3 and 4 of the side rails 1 and 2, being secured in place by the pins 28 and 29 extending through said block and side rails, as clearly illustrated in Figure 2 of the drawings. The lower end of the member 27 may be formed hollow if desired, to provide a driving pin portion 30 for said stake.

An aperture 31 is formed through the upper end portion of the member 27, and a pin or shaft 32 extends through the side rails 1 and 2 and transversely through said aperture. A pulley 33, similar to a sash pulley, is disposed upon the pin or shaft 32 and serves as a guide for the chalk line 33' as it runs or is pulled from the reel 12 and about said pulley 33. A ring 34 is secured to the outer end of the chalk line 33' and will be attached to a hook 35 secured on the deadman or stake hereinafter described.

A pair of U-shaped channel hinge members 36 and 37 will be formed with the apertured attaching ears 38, and will be pivotally mounted on the cross pin 39 extending through the side rails 1 and 2 and through the block 8, as illustrated in Figure 3 of the drawings, said hinge members 36 and 37 being disposed about the upper ends of the bracing legs 40 and 41 and secured thereto by means of the pins 42. The bracing legs 40 and 41 will extend outwardly and downwardly at an angle, and will be connected together by means of the reinforcing rung 43 provided for strengthening purposes. A peripheral arcuate guide groove 44 will be formed about the rung 43 and will serve to guide the chalk line 33' as it extends toward the associated deadman or braceable stake, now to be described.

The braceable stake is formed of any desired and suitable material, being generally designated by the reference numeral 44' and having an enlarged square head 45 on its upper end. A removable round tapered metal point 46 will be secured on the lower end of the stake 44' for providing for the easy driving of the same into the ground. The hook 35 previously mentioned will be screwed into one edge of the deadman or stake 44' to receive the ring 34 on the outer end of the chalk line 33' when the same is connected therewith.

Opposed shoulders 47' and 48 are formed on the lower surface of the head 45 of the stake 44' and cooperate with the cam ends 46' upon the upper ends of the bracing legs 47 pivotally mounted on the pins 48' extending through the stake 44', whereby the legs 47 will be held in parallel alignment with the stake 44' when the same is not actually in use and driven into the ground.

From the foregoing description, it will be apparent that a highly efficient form of chalk line reel and stake and an associated braceable stake or deadman will have been devised and provided.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A stake consisting of a pair of spaced side rails, a reel secured between said rails, a spacing block secured between the rails at the intermediate portion thereof, a combined pulley housing and stake pin secured between said rails near the lower end thereof and a pulley mounted in the housing around which the line passes from the reel.

2. A stake consisting of a pair of spaced side rails, a reel secured between said rails, a spacing block secured between the rails at the intermediate portion thereof, a combined pulley housing and stake pin secured between said rails near the lower end thereof, and a pulley mounted in the housing around which the line passes from the reel and braces secured to said stake, said braces having a rotatably mounted guide means thereon for a line passing around the pulley to the reel rotatably mounted in said stake.

3. The combination of claim 2 wherein said braces consist of a pair of legs, a transverse reinforcing rung connecting the legs, and there being a groove in said rung to guide the line to the pulley.

JOHN J. ROSE.

REFERENCES CITED

The following references are of record in the file of this patent:

UNITED STATES PATENTS

| Number | Name | Date |
|---|---|---|
| 73,019 | Martin | Jan. 7, 1868 |
| 128,539 | Drake et al. | July 2, 1872 |
| 1,444,344 | Gourley | Feb. 6, 1923 |
| 2,236,305 | Ahlin | Mar. 25, 1941 |